United States Patent
Maes et al.

(10) Patent No.: US 12,498,631 B2
(45) Date of Patent: Dec. 16, 2025

(54) METHOD AND SYSTEM FOR SPATIAL AND ANGULAR UNIFORMIZATION OF LIGHT BEAMS

(71) Applicant: BARCO N.V., Kortrijk (BE)

(72) Inventors: Dirk L.A. Maes, Bissegem (BE); Dries Jan Doornaert, Wevelgem (BE); Daniel Lambot, Leuze-en-Hainaut (BE)

(73) Assignee: BARCO N.V., Kortrijk (BE)

(*) Notice: Subject to any disclaimer, the term of this patent is extended or adjusted under 35 U.S.C. 154(b) by 1081 days.

(21) Appl. No.: 17/434,201

(22) PCT Filed: Mar. 8, 2019

(86) PCT No.: PCT/EP2019/055931
§ 371 (c)(1),
(2) Date: Aug. 26, 2021

(87) PCT Pub. No.: WO2020/173577
PCT Pub. Date: Sep. 3, 2020

(65) Prior Publication Data
US 2022/0171270 A1    Jun. 2, 2022

(30) Foreign Application Priority Data
Feb. 28, 2019  (WO) ............... PCT/EP2019/055081

(51) Int. Cl.
*G03B 21/20* (2006.01)
*G02B 27/09* (2006.01)

(52) U.S. Cl.
CPC ....... *G03B 21/208* (2013.01); *G02B 27/0994* (2013.01)

(58) Field of Classification Search
CPC ................. G03B 21/208; G02B 27/0994
USPC ................................................. 353/30
See application file for complete search history.

(56) References Cited

U.S. PATENT DOCUMENTS

| 5,978,142 A | 11/1999 | Blackham |
| 8,960,927 B2 | 2/2015 | Okamoto et al. |
| 2008/0239498 A1 | 10/2008 | Reynolds |
| 2009/0109698 A1* | 4/2009 | Koyata ............ G02B 19/0014 362/553 |
| 2010/0278503 A1 | 11/2010 | Nakai et al. |
| 2013/0044367 A1* | 2/2013 | Lippey .................. G02B 27/48 359/327 |

(Continued)

FOREIGN PATENT DOCUMENTS

| EP | 2228674 A1 | 9/2010 | |
| JP | S60117201 A * | 6/1958 | ............. G02B 6/42 |
| JP | 2003059799 A | 2/2003 | |

(Continued)

OTHER PUBLICATIONS

Translation of 2014091065 (Year: 2025).*

(Continued)

*Primary Examiner* — Jerry L Brooks
(74) *Attorney, Agent, or Firm* — HSML P.C.

(57) ABSTRACT

An imaging projection system that can project uniform illumination onto a light modular while keeping the point spread function small. A Fourier optical system can be inserted between two uniformization structures so that when light passes the through the system, the light output is uniform both in spatial- and angular space.

15 Claims, 11 Drawing Sheets

(56) References Cited

U.S. PATENT DOCUMENTS

2017/0329232 A1    11/2017    Goorden et al.

FOREIGN PATENT DOCUMENTS

| TW | 201237511 A | 9/2012 | | |
|----|----|----|----|----|
| WO | 2012139634 A1 | 10/2012 | | |
| WO | WO-2014091065 A1 | * | 6/2014 | ......... G02B 27/0927 |
| WO | 2015054797 A1 | 4/2015 | | |
| WO | 2015184549 A1 | 12/2015 | | |
| WO | 2017194393 A1 | 11/2017 | | |
| WO | 2018141407 A1 | 8/2018 | | |

OTHER PUBLICATIONS

Office Action issued in CN201980093311.8, dated Feb. 24, 2024, with Machine translation, 16 pages provided.

Decision on Rejection issued in Chinese Application No. 201980093311.8, dated Jun. 29, 2024, with machine translation.

Office Action issued in Chinese Application No. 201980093311.8, dated Sep. 14, 2023, with English translation.

International Search Report and Written Opinion issued in PCT/EP2019/055931, dated Feb. 17, 2020.

Hoskinson et al., "High-dynamic range image projection using an auxiliary MEMS mirror array", published in Optical Society of America, vol. 16, No. 10, May 12, 2008.

Multimode special optical fibers for laser beam transmission—LEONI, available at https://www.leoni-fiber-optics.com/en/products-and-services/fibers/multimode-special-optical-fibers/ (accessed Aug. 26, 2021).

Examples of conventional integrators, Materion Barr Precision Optics & Thin Film Coatings, Materion Corporation, available at https://materion.com/-/media/files/precision-optics/data-sheets-2012/light-tunnel-data-sheet.pdf?la=en&hash=1B2EE007DE55470622DCA2D0A90842D6EDD0C01A (accessed Aug. 26, 2021).

Newport Corporation, product brochure for Light Pipe Homogenizer, available at https://www.newport.com/f/light-pipe-homogenizer (accessed Aug. 26, 2021).

Office Action issued in Taiwanese Application No. 109106828, dated Apr. 18, 2025, with English translation.

Intention to grant issued in European Application No. 19714552.7, dated Apr. 7, 2025.

Office Action issued in TW109106828, mailed Apr. 18, 2025, with English translation.

* cited by examiner

METHOD AND SYSTEM FOR SPATIAL AND ANGULAR UNIFORMIZATION OF LIGHT BEAMS

The present invention relates to a method and/or system for spatial and/or angular uniformization of light beams.

BACKGROUND

In the field of imaging projection, current projectors are often based on light modulator technology, for example various types of spatial light modulators like light valves (LCD, DLP or LCOS) or micro-mirror devices (DMD). The entire modulator, such as a light valve, is illuminated as uniformly as possible and blocks the light where it is not needed. Disadvantages with this can be:

1/ for an average video signal a significant amount of light energy is wasted because the modulator will dump all light that is not required for an image.
2/ the ability to block light is not perfect and still a minor amount of light is leaking through to the image when the image is supposed to be black. This can reduce contrast as the display of a completely black image is not perfectly black.

Currently, there is a desire for displays, including projection displays to be capable of producing a wider contrast dynamic range. This means a darker black level and higher peak brightness levels, which can enable more details to be distinguishable in the dark or black regions of an image and a more adequate representation of the very bright image highlights. However, it is not desired that the average picture brightness level is much increased because this will mainly force eye adaptation to a higher level (which may be painful) without gaining benefit for the perceived dynamic range.

Usually, when increasing the peak brightness level, the black or darkest illumination level also is increased. In typical images, more information is encoded near this level, so this is highly undesirable to lose detail in this way. Alternatively, a cascade of 2 light modulators has been proposed in U.S. Pat. No. 5,978,142. While this approach is effective to lower the light leakage in black, it will significantly affect the light throughput efficiency as losses in the first light modulator (in e.g. the imaging optics, mirrors, etc.) easily reduce the peak brightness level by 50%.

Further in a typical High Dynamic Range signal, the ratio between peak brightness level and average brightness level becomes even larger, so an even larger amount of the light energy will be blocked.

A more efficient implementation of an HDR projector can be where only a second light modulator is of the light valve type and where a first light modulator distributes or steers the light only where it is needed. For the same amount of illumination light input, such solution delivers both darker black levels and brighter peak white levels. WO2015054797 proposes such an approach where the first light modulator is based on a phase modulating LCOS device.

An approach where an analogue MEMs device is used as the first light modulator is described in a paper from Hoskinson and Stoeber: "*High-dynamic range image projection using an auxiliary MEMS mirror array*" published in 2008 in Optical Society of America.

Any light distribution at the position of the first light modulator in a light steered projector can be converted into the desired light distribution at the second light modulator. However it is still desirable that the light is distributed uniformly across the first light modulator. This will spread out the thermal load on the first light modulator and make optimal use of the resolution and &endue of the device.

The peak power illumination load on the first light modulator for a circular beam with a Gaussian profile, could be a multiple of the peak power illumination load for a top-hat uniform rectangular illumination profile. FIG. 1A) shows a circle representing a projection of a circular light beam with Gaussian profile being fit into a uniform 16:9 rectangle. The light beam circle covers only 44% of the full area of the rectangle. This could push the local temperature well beyond the normal operating range of the device and/or significantly decrease the life time. It would be preferable if the light of the circular light beam were uniformly distributed within the rectangle, as in FIG. 1B).

While uneven illumination profiles can be calibrated and taken into account while calculating the required light steering, the stability of the profile will be critical. For example if multiple discrete laser sources are combined to illuminate the first light modulator it could be that differential temperature- or aging effects between the discrete laser sources results in a modified illumination profile that is difficult to predict over the lifetime of the device.

Hence, it is preferred that light beams from multiple discrete laser sources are properly mixed so that each light source contributes equally and uniformly to all positions on the first light modulator. A further advantage is that this will minimize laser speckle effects in the image, especially if lasers from slightly different wavelengths are combined for each primary color.

Additionally, the performance can be affected by the angular spread of the illumination light beam. In an ideal scenario, a laser light beam is perfectly collimated so that all parts of the beam propagate in the same direction. An optical system can then focus the light beam onto a single focus point. However, a real-life laser source cannot provide a perfectly collimated light beam but it can have a degree of divergence, or angular spread, around the propagation- or optical axis. Thus, when trying to focus the light beam this light spread will be visible as a blurred spot around the optical axis. This spread can be referred to as the system point spread function (PSF).

In a light steering system, the focus point can be positioned at an intermediate image plane e.g. at a stationary or moving diffuser located at a distance from the first light modulator. Due to light beam divergence, the light spot at the intermediate image plane will have a finite dimension. The minimal size of a light steered beam spot at the intermediate image (and therefore in the final image) can then be a function of the angular spread at the position of the first light modulator and the distance between the first light modulator and the intermediate image plane. In a typical configuration, the angular spread of the illumination of the first light modulator can be below +/−0.1°. The system PSF can also be used in calibration steps for calculating the real brightness level profile at the intermediate image. For a multiple of light sources, differential temperatures or differential aging could change how the laser or light energy is distributed in angular space so that the distribution of brightness in the point spread function will vary. Hence, since the stability of the calibration step depends on the stability of the angular spread of the illumination light, it is desired to minimize the effects of differential values of properties such as e.g. temperatures and aging.

FIG. 2 illustrates a not perfectly collimated light or laser beam 20 which has an angular spread 21. It is reflected by a light modulator 22 to form an intermediate image on a moving diffuser 23 located in an intermediate plane 24. The beam spot on the moving diffuser 23 has a spread 25 around the ideal focus 26 (at the optical axis). The spread 25 can be described by a point spread function". FIG. 2 also comprises incoming light beams 27 and 28, which have similar angular spreads and therefore contributes to approximately the same PSF.

FIG. 3 shows how angular and spatial light distributions can be altered by collimation (full arrows) or imaging (dashed arrows). If the light is delivered via an optical optical fiber and the light from the optical fiber is collimated onto the first light modulator, then the angular brightness profile 31 of the light emitted by the optical fiber determines the spatial light distribution 32 on the phase modulator. The spatial distribution 30 of the light emitted by the optical fiber translates into angular light distribution 33 on the phase modulator and can therefore be directly related to the shape of the point spread function. If the light at the exit of the optical fiber is imaged onto the phase modulator, the spatial uniformity 30 of the light will determine the spatial uniformity 32 of the light projected on the phase modulator. The angular uniformity 31 of the light determines the angular uniformity 33 of the light projected on the phase modulator and, thus, the shape of the point spread function.

In both cases the spatial and angular light distribution of the light at the exit of the optical fiber are critical parameters.

Calibration of an imaging projection system can be improved when the illumination angular profile is smooth (e.g. Gaussian). On the other hand, if the illumination angular profile is highly irregular, a small difference in alignment between the actual PSF position and the presumed PSF position can yield large differences in the actual light modulator illumination versus the assumed light modulator illumination. Eventually this can create large errors in the final image. FIG. 4A show examples of smooth brightness level profiles, and FIG. 4B show examples of irregular brightness level profiles where the brightness level varies abruptly with the angle. These are cross-sections only, the requirement for smooth brightness level variations with angle applies in two dimensions.

SUMMARY OF THE INVENTION

It is an object of the present invention to provide a method and/or system for spatial and/or angular uniformization of light beams.

In one embodiment of the present invention there is provided a system for providing uniform light beams for use with a light source. The system can comprise at least two uniformization structures, for example a first and a second uniformization structure or a at least a first and a second uniformization structure. Any or all of the uniformization structures can be for example optical fibres, each having an input- and an exit, e.g. each having an input- and an exit plane. The system can further comprise a Fourier optical system having a first and second focal point. The light source, the first uniformization structure, the Fourier optical system and the second uniformization structure can be placed immediately and consecutively after each other. The Fourier optical system can be positioned so that the exit (or exit plane) of the first uniformization structure can conincide with the first focal point of the Fourier optical system, and the input (e.g. input plane) of the second uniformization structure can coincide with the second focal point.

Additionally or alternatively, at least one of the two first and second uniformization structures can have a cross-section area having a rectangular shape.

Additionally or alternatively, at least one of the first and second uniformization structures can have a cross-section area and a light modulator can have an image area, and an aspect ratio of the cross-section area of the at least one of the first and second uniformization structures can be the same as the aspect ratio of the area of the light modulator. The light modulator can be a spatial light modulator or light valve either of which can be transmissive or reflective.

Additionally or alternatively, the first uniformization structure can be bent with a bending radius. Additionally or alternatively, the first uniformization structure can adopt different bending radius at different points in time.

Additionally or alternatively, at least one of the first and second uniformization structures can be a conventional integrator. The at least first and second uniformization structures can be conventional integrators. Additionally, the system can comprise a diffuser, and the diffuser can be located between a position where the light source can be placed and the first uniformization structure.

In another embodiment of the present invention there is provided a method for use with a light source and for providing uniform light beams, the method making use of at least two uniformization structures, for example optical fibres, each having an input and an exit e.g. an input plane and an exit plane, and a Fourier optical system having a first and second focal point. The method can comprise placing the light source, the first uniformization structure, the Fourier optical system and the second uniformization structure immediately and consecutively after each other. It can further comprise positioning the Fourier optical system so that the exit (or exit plane) of the first uniformization structure coincides with the first focal point of the Fourier optical system, and the input (e.g. input plane) of the second uniformization structure coincides with the second focal point of the Fourier optical system.

Additionally or alternatively, at least one of the at least a first and a second uniformization structure can have a cross-section area and the method can comprise configuring said area as a rectangular shape.

Additionally or alternatively, the at least one of the at least a first and a second uniformization structure can have a cross-sectional area and the light modulator can have an image area, wherein the method can comprise configuring the aspect ratio of the cross-section area of the at least one of the at least a first and a second uniformization structures to be the same as the aspect ratio of the area of the light modulator.

Additionally or alternatively, the method can comprise bending the first uniformization structure with a bending radius. Additionally or alternatively, the bending radius can be varied with a frequency (i.e. periodically along the first uniformization structure).

Additionally or alternatively, the method can comprise implementing the at least one of the at least a first and a second uniformization structure as a conventional integrator. Additionally, there can be a diffuser and the method can comprise placing the diffuser between the position for the light source and the first uniformization structure.

In anther embodiment of the present invention there is provided an optical assembly for use with a light source and for providing uniform light beams. The system can comprise at least two uniformization structures, for example optical fibres, each having an input and an exit, e.g. an input- and an exit plane. The system can further comprise a Fourier optical system having a first and second focal point. And the light source, the first uniformization structure, the fourier optical system and the second uniformization structure can be placed immediately and consecutively after each other. The Fourier optical system can be positioned so that the exit (e.g. exit plane) of the first uniformization structure coincides with the first focal point of the Fourier optical system, and the input (e.g. input plane) of the second uniformization structure coincides with the second focal point of the Fourier optical system.

Additionally or alternatively, at least one of the at least a first and a second uniformization structure can have a cross-section area having a rectangular shape.

Additionally or alternatively, at least one of the at least a first and a second uniformization structure can have a cross-section area and the light modulator can have an image area, and the aspect ratio of the cross-section area of the at least one of the at least a first and a second uniformization structure can be the same as the aspect ratio of the area of the light modulator.

Additionally or alternatively, the first uniformization structure can be bent with a bending radius. Additionally or alternatively, the first uniformization structure can adopt different bending radii at different points in time.

Additionally or alternatively, the at least a first and a second uniformization structure can be a conventional integrator. Additionally or alternatively, the optical assembly can comprise a diffuser, and the diffuser can be placed between a position for a light source and the first uniformization structure.

In a further set of embodiments which relate to an independent aspect of the present invention an image projection system is provided for use with a light source, the image projection system comprising a light modulator and a uniformization structure, the uniformization structure having an elongated shape and being adapted to receive light from a light source and to guide the light onto the light modulator, wherein the uniformization structure has a rectangular structure, e.g. rectangular cross-section, and one or more bendings.

The uniformization structure can have a cross-section area having a shortest side, and each bending radius is at least 200 up to 1000 times larger than the shortest length of the cross-section area.

The uniformization structure can have a cross-section area which is rectangular.

The uniformization structure can have a cross-section area having corners wherein the shape of each corner is rounded with a radius of curvature.

The uniformization structure can have a cross-section area and the light modulator can have an image area, and the aspect ratio of the cross-section area of the uniformization structure is the same as the aspect ratio of the image area of the light modulator.

In another aspect, the present invention provides a method for use with a light source and for diffusing light in an image projection system comprising a light modulator and a uniformization structure, the uniformization structure having an elongated shape and being adapted to receive light from a light source and to guide the light onto the light modulator, wherein the method comprises bending the uniformization structure in one or more places.

The uniformization structure can have a cross-section area having a shortest side, and the method comprises the step of configuring each bending radius to be at least 200 up to 1000 times larger than the shortest length of the cross-section area.

The uniformization structure can have a cross-section area and the method comprises configuring the cross-section area to be rectangular.

The uniformization structure can have a cross-section area having the corners and the method comprises configuring each corner into a rounded shape defining a curvature radius.

The uniformization structure can have a cross-section area and the light modulator has an image area, the method comprises configuring the aspect ratio of the cross-section area of the uniformization structure to be the same as the aspect ratio of the image area of the light modulator.

BRIEF DESCRIPTION OF DRAWINGS

FIGS. 6A and 6B to 8A and 8B show embodiments of the present invention comprising spatial and angular light distribution charts.

Definitions

Figure 1A:
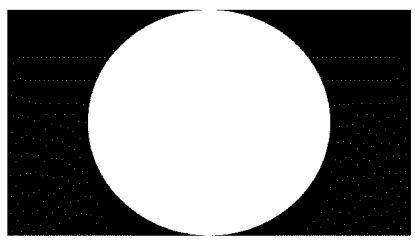
FIGS. 1A and B show cross-sections of an illumination light beam.
Figure 1B:
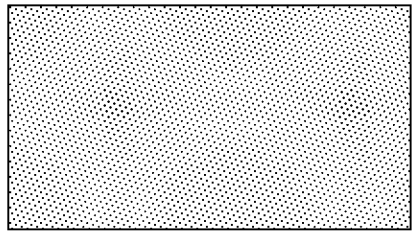
Figure 2:
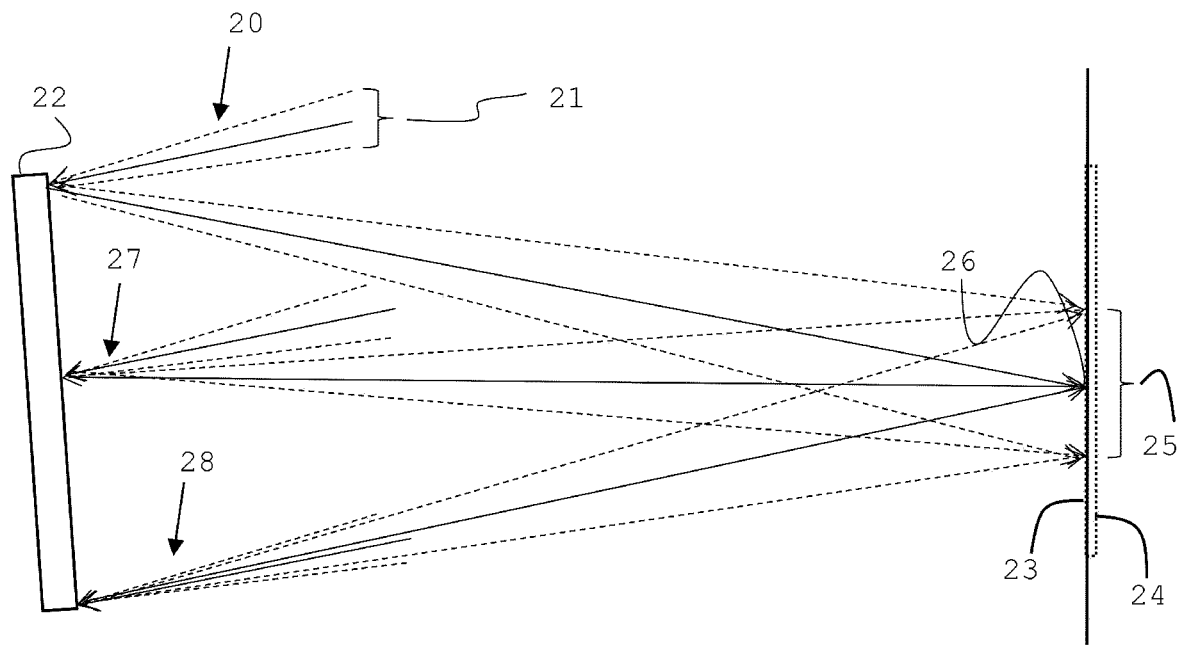
FIG. 2 shows a non-ideally collimated illumination light beam with angular and spatial spread around the optical axis.

The "point spread function" (PSF) describes a spread or blur of light around a focus point on a surface of light beams, due to divergence in the light beams. The spatial distribution of the PSF can describe the area over which the light is spread over the physical surface. The angular light distribution can describe the different angles with which the light beams are impinging on the physical surface.

An "optical fiber" can be a flexible fiber made out of a transparent material such as glass, silica or plastic. The diameter of optical fibers are normally in the sub-mm range.

An "optical diffuser" or a "diffuser" can be an optical component with the ability to scatter light in random directions.

A "light modulator" can be an optical component that can modulate a light beam impinging on it. One type of light modulators can be referred to as "amplitude modulators" which can modulate the amplitude of the incoming light. This can be accomplished by technologies such as e.g. Liquid Crystal Display (LCD), Digital Light Processing (DLP) or Liquid Crystal on Silicon (LCoS), a micromirror digital device (DMD) or any other technology where a controlled amplitude change of a light beam can be introduced. Another type of light modulators can be referred to as "phase modulators" which can modulate the phase of the incoming light. This can be accomplished by technologies such as e.g. LCoS, Micro-Electro Mechanical Systems (MEMS), or any other technology where a controlled phase shift of a light beam can be introduced.

A "uniformization structure" is an optical component that can perform uniformization of a light beam. It is often elongated and has an entrance or input and an exit or output. When a light beam is inserted or inputted into a uniformization structure, it is reflected on the inside walls of the uniformization structure. The reflective properties of the uniformization structure depend on its geometry and material from which it is made. Examples are e.g. integrating rods made of fused silica or glass, often with square or circular cross-sections. Alternatively it can be optical fibers having high refractive index cores with rectangular, square or hexagonal cross-sections surrounded by a low refractive index cladding material.

"Uniform". For a spatial light distribution, the brightness level can be said to be uniform if on every position it is better than 70%, preferably better than 80%, of the average brightness level over the light beam cross section.

For the angular light distribution, the brightness observed from different angles in the range is uniform if it is constant, or smooth (monotone with no local maximum). This can, for example, be a Gaussian distribution or a top hat distribution with a ramp up and ramp down near the extreme edges. Ripple in the middle of the distribution is preferably less than 5%, or more preferably less than 2%.

A "Fourier transforming optical system" is a system of optical components that can transform a light beam according to a Fourier transformation. For example, if a distribution of light in linear space is entered in the Fourier system, the output can describe a similar light distribution in e.g. frequency space or angular space.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In accordance with embodiments of the present invention a light steering system can have a first light modulator illuminated with a light beam that provides a uniform rectangular light spot and has a smooth angular light distribution. In case the light source comprises multiple discrete laser sources, these are preferably properly mixed. In the ideal case each light source contributes evenly to each position on the first light modulator, as well as it contributes evenly to the entire angular range. In this way the system can become less sensitive to a reduction in light power (or failure) of a single light source. Additionally, if light beams of multiple wavelengths are overlaid, speckle patterns can be reduced by means of wavelength diversity.

Figure 3:
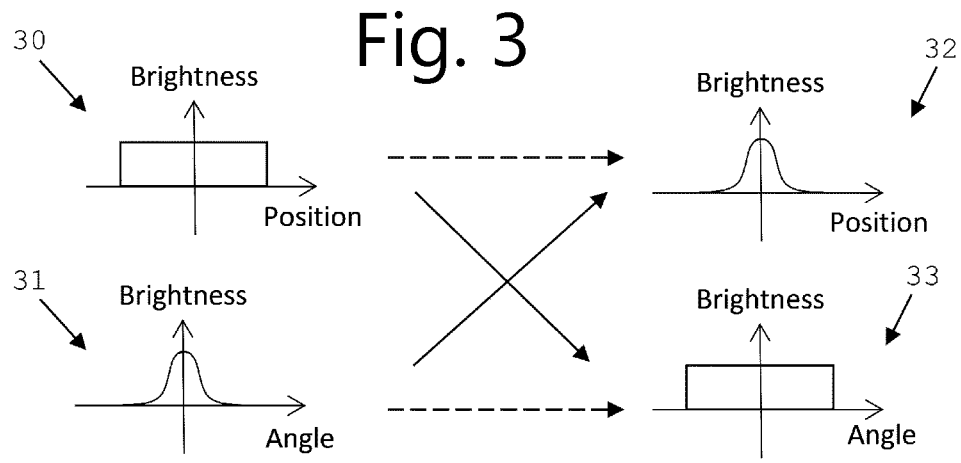
FIG. 3 shows how collimation or direct imaging of a light beam affects its angular and spatial light distribution.
Figure 4A:
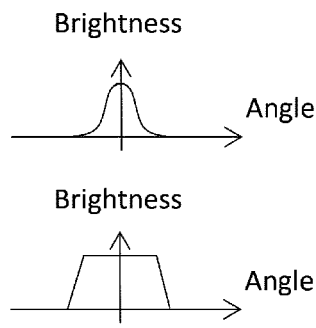
FIG. 4 shows smooth and irregular brightness distribution profiles.
Figure 4B:
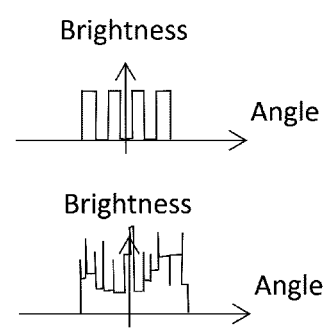

The spatial distribution of the illumination can determine how the light energy is distributed over the different highlight areas in an image. If this spatial illumination profile changes, the distribution of the light over the different highlights will fluctuate e.g. some highlight areas will get brighter while others get darker. It is possible to use a phase algorithm for the light steering beam that can include mixing light from different locations, in order to reduce the sensitivity toward a non-uniform and/or varying input illumination beam. If every highlight area gets light from every position on the panel, it is possible to largely cancel out non-uniformity in the illumination of the phase panel. However, more efficient phase algorithms (cfr. WO2015184549) try to minimize the steering angle and will, for example, preferably send light from the top right corner on the phase panel towards highlights in the top right corner in the intermediate image. To be able to use these more efficient algorithms it is important to guarantee a uniform and stable illumination across the phase panel. The angular light distribution determines the shape of the illumination light described by the point spread function at the intermediate image (which equals the shape of the smallest focused highlight), as shown in FIG. 3. If the angular light distribution profile changes, the distribution of the illumination light within the point spread function changes. This can lead to changes in the high frequency brightness levels and, hence, color variations in an RGB full color system.

A proper uniformization of the illumination light that delivers a stable light profile to the first light modulator in both spatial and angular domain is preferred. Ideally, a uniformization structure provides such uniformity irrespective of the characteristics of the light at its entrance. If multiple laser sources are coupled at its entrance, each source will preferably contribute equally to every position and every angle at the phase modulator, such that differential temperature and aging effects are leveled out and laser speckle is minimized.

Methods to improve the spatial and angular uniformity from an array of individual laser sources have been disclosed in WO 2012139634, which discloses a system comprising two integrator stages. The two integrator stages can each be preceded by a diffuser, and the output from the first integrator stage can be imaged onto the diffuser in front of the second integrator stage.

For a light-steered projection system it is desired to keep the point spread function small since this enables addressing of small highlight features in the image. Hence, the angular spread of the illumination beam incident on the first light modulator is preferably kept small. But conventional uniformization structures, such as solid rod integrators or hollow light pipes can only mix an incoming light beam properly if the beam comprises sufficient angular spread and/or if the integrator or pipe is very long. Hence, conventional rod integrators or light pipes may not be applicable for a light-steered projection system.

A workable angular spread can, however, be obtained with an integration rod of conventional length if its cross-section is sufficiently small. For example, it can be about 100 times smaller than the dimensions of the first light modulator. The spread angles of +/−0.1 degrees at the first light modulator can then transform into spread angles of +/−10° at the integrator rod, which can be sufficient to provide good integration over a limited length. For example, the length can be 50-100 times the height of the integrator rod. Suppose the height of the first light modulator is around 1 cm, then the height of the integrating rod is 100 µm (the minimum length can be 5 to 10 mm).

Integration rods with the above small cross-sections can be implemented using, for example, optical fibers having fused silica cores with rectangular, square or hexagonal cross-sections. For example, Leoni offers multimode special optical fibers (https://www.leoni-fiber-optics.com/en/products-and-services/fibers/multimode-special-optical-fibers/). Custom cross-sections can be produced.

These optical fibers deliver a top-hat intensity distribution at their output. The output can be imaged onto the first light modulator, and a uniform brightness level distribution across the first light modulator can be achieved (if the optical fiber has the same shape as the modulator).

An ideal rectangular optical fiber (i.e. an optical fiber having a rectangular cross-section) will mirror the angular light distribution at its input in horizontal and vertical direction, but no angular uniformization will occur. If multiple light sources are coupled at the input from different angles, the output image might comprise angular gaps between the discrete sources.

Embodiment I, Optical Fiber

Figure 5:
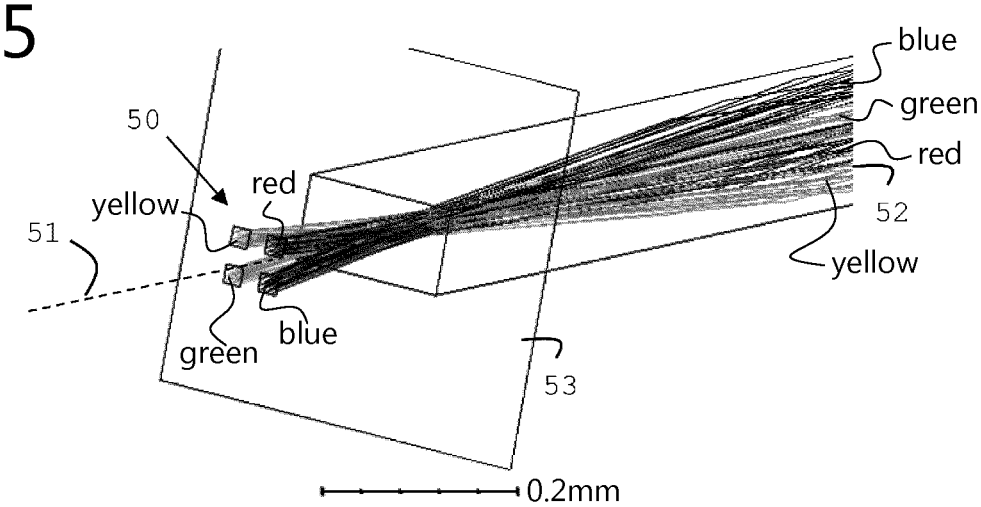
FIG. 5 shows four sub-light sources entering a uniformization structure.

FIG. 5 shows a light source comprising four sub light sources 50 coupled from 4 different angles (e.g. 3 degrees relative to the normal or optical axis 51) at the entrance of a optical fiber 52 for use with embodiments of the present invention. The sub light source beams overlap at the input (plane) 53. The sub light source beams span a +/−1.5 degree angle, hence, there is a gap in the angular space. The light distribution at the input is neither spatically or angularly uniform. Spatial and angular radiance plots where simulated, based on the above measures. The results can be presented in spatial- and angular radiance distribution charts, where the x- and y axes extend in linear- and angular space, respectively. The right hand side intensity scale represents the radiance.

Figure 6A:
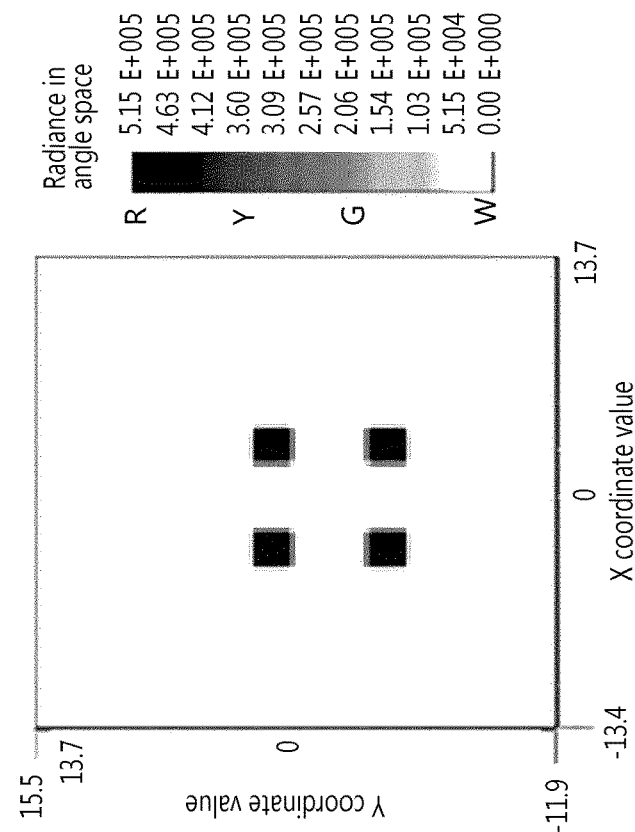
Figure 6B:
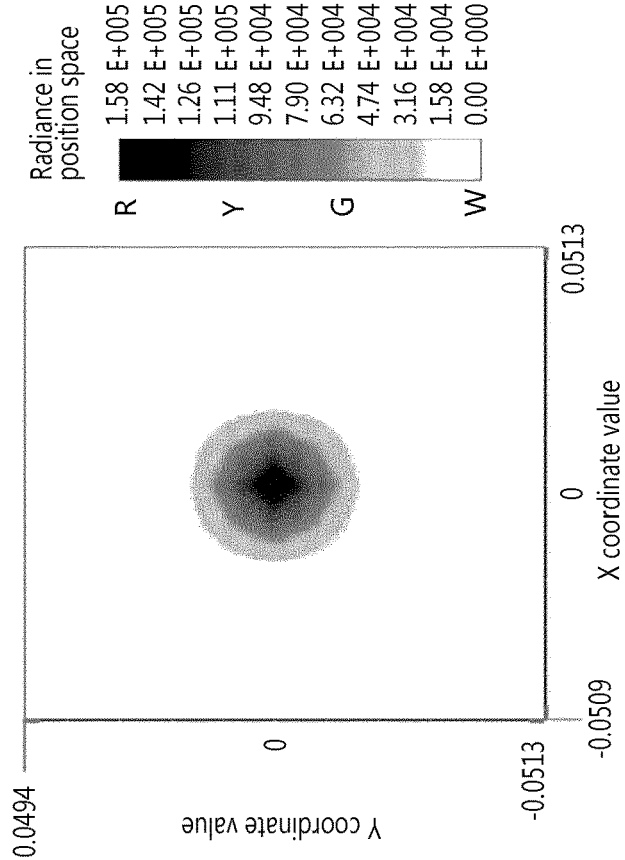

At the input 53 the light sources 50 deliver a non-uniform illumination spot, as shown in the spatial distribution chart in FIG. 6A. With the dimensions above, the diameter of the spot is approximately 20 µm. FIG. 6B shows the corresponding angular light distribution comprising the gaps in angular space, i.e. there is no radiance present in these angles or directions.

Figure 7B:
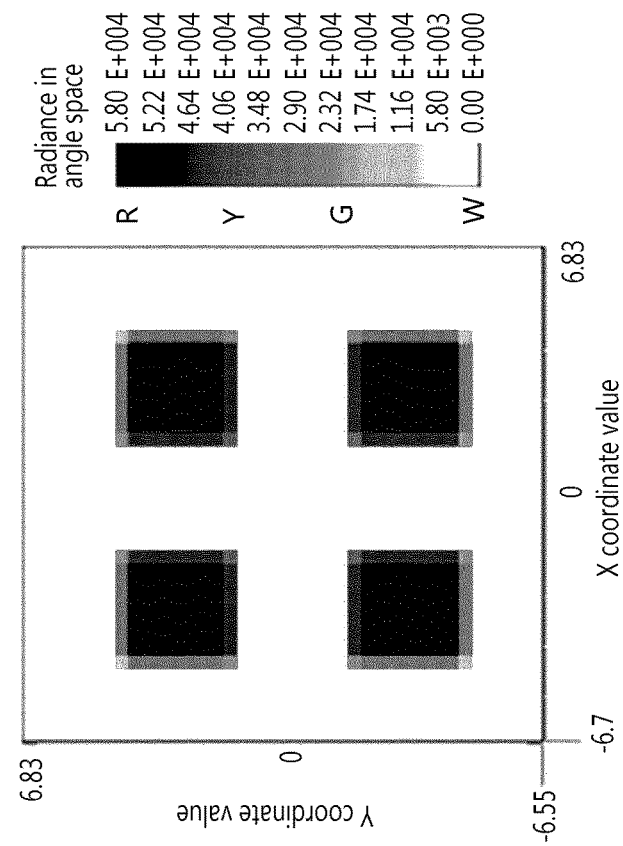
Figure 7A:
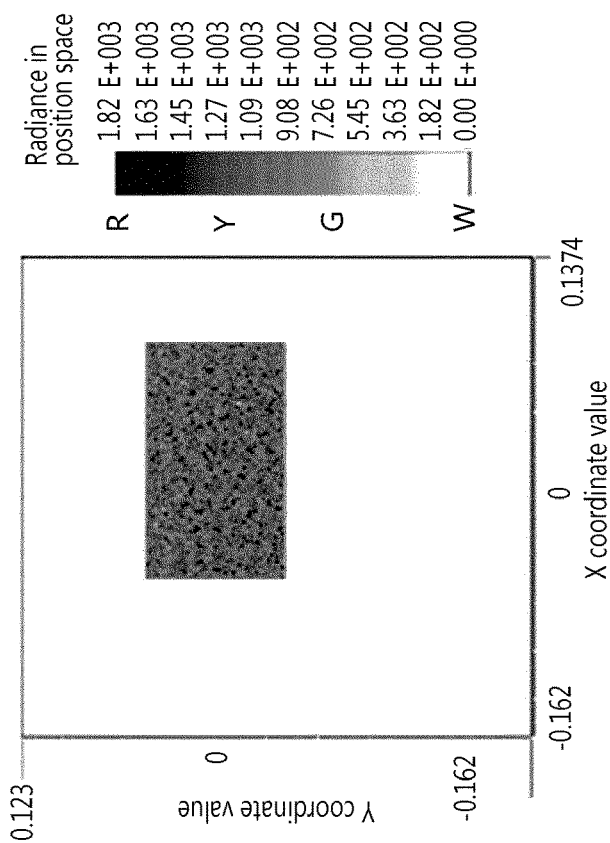

The light beam of FIGS. 5 and 6 can be input into a rectangular optical fiber of a cross-section of e.g. 160×90 µm and a length of 20 cm. FIGS. 7A and 7B show the spatial- and angular radiance distribution, respectively, at the output plane of the optical fiber. Hence, the spatial distribution in FIG. 7A exhibits a good uniformity. However, the angular radiance distribution in FIG. 7B shows that the non-uniform angular light distribution is still non-uniform. However, since the rectangular optical fiber mirrors the angular light distribution in both horizontal and vertical direction, it mixes the four sub light sources in angular space. This means that if one of the sub light sources would fail, the angular profile would at least remain stable.

Embodiment II, Asymmetry

The sub light or laser sources at the input can be arranged in an asymmetric angular configuration. This can result in an overlay of the four angular profiles (or radiance distribution) at the output:
The input profile without mirroring
The input profile with horizontal only mirroring
The input profile with vertical only mirroring
The input profile with horizontal and vertical mirroring
The gaps in angular space at the output can be reduced or eliminated by considering this mirroring effect. Care should also be taken to avoid that large overlaps are created.

Figure 8B:
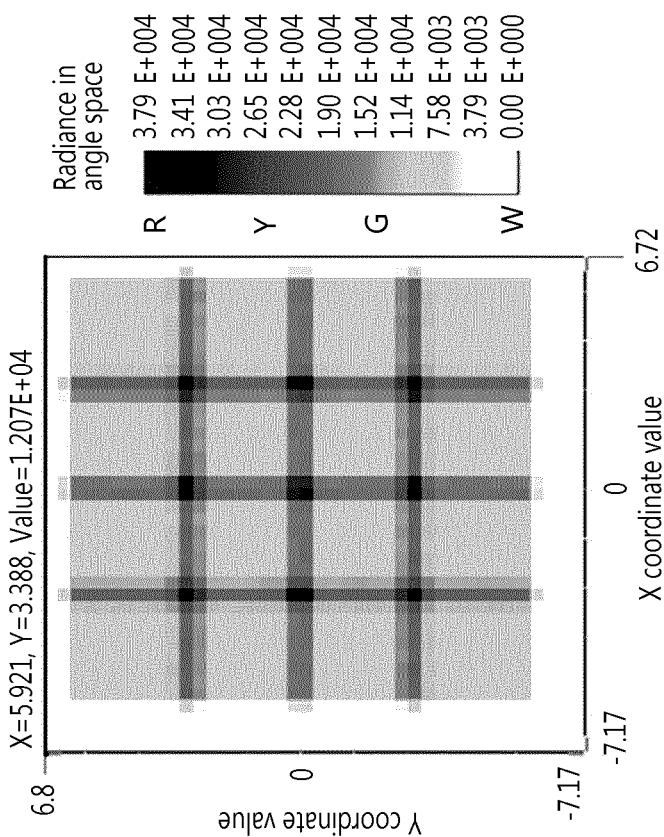
Figure 8A:
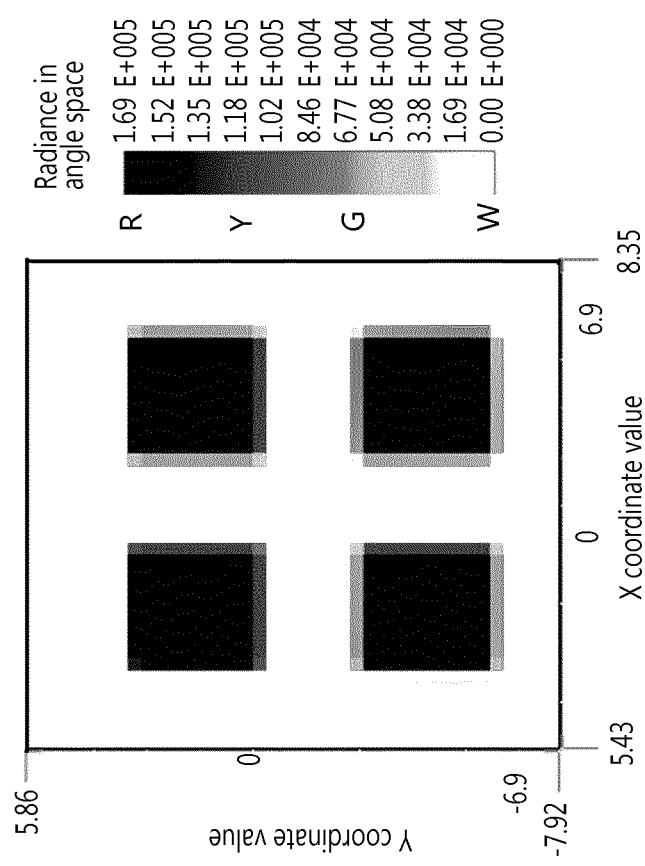

The sub light sources of FIG. 5 can coupled into a rectangular optical fiber at four discrete angles asymmetrically distributed around the normal direction. The gaps in the angular light distribution chart can be chosen to be similar in size to the angle coverage of each input source. The resulting angular light distribution at the input can be seen in FIG. 8A. FIG. 8B shows the angular light distribution at the output. The different subimages comprise the input angular light distribution in FIG. 8A but also the angular light distributions of the horizontally and/or vertically mirrored images. The resulting angular light distribution is free of gaps. Some overlap still creates higher intensities for certain angles.

However, as the mirrored images now have minimal overlaps, the four sources are no longer mixed in angular space. Each source has its own four output spots, and differential temperature or aging effects will result in a change in angular light distribution.

Embodiment III, Bending

Embodiments of the present invention can be beneficial because they introduce a controlled amount of diffusion to obtain mixing of the light beams. The bending of optical fibers can be used with other embodiments of the present invention but it relates to an independent stand alone embodiment of the present invention.

Because of the small cross-section of the optical fiber integrating rod, conventional diffusers can no longer be used. The grain size of the diffuser needs to be substantially smaller than the cross-section of the optical fiber and the diffuser needs to be very close to the optical fiber entrance not to spill any light. A further complication is the extreme power density.

The inventors have found that it is possible to introduce controlled diffusion in the optical fiber by slightly bending it. Because of the mirroring effect, a bending in one direction will result in a symmetrical increase of the distribution in angular space. Hence, the final angular light distribution will be the incoming angular light distribution +/− a number of degrees.

By arranging the rectangular optical fiber in a three dimensional S-shape, it is possible to add diffusion along the x- and y axes in angle space. The amount of diffusion around the horizontal axis can be chosen to be identical or different than the amount of diffusion around the vertical axis.

Figure 9A:
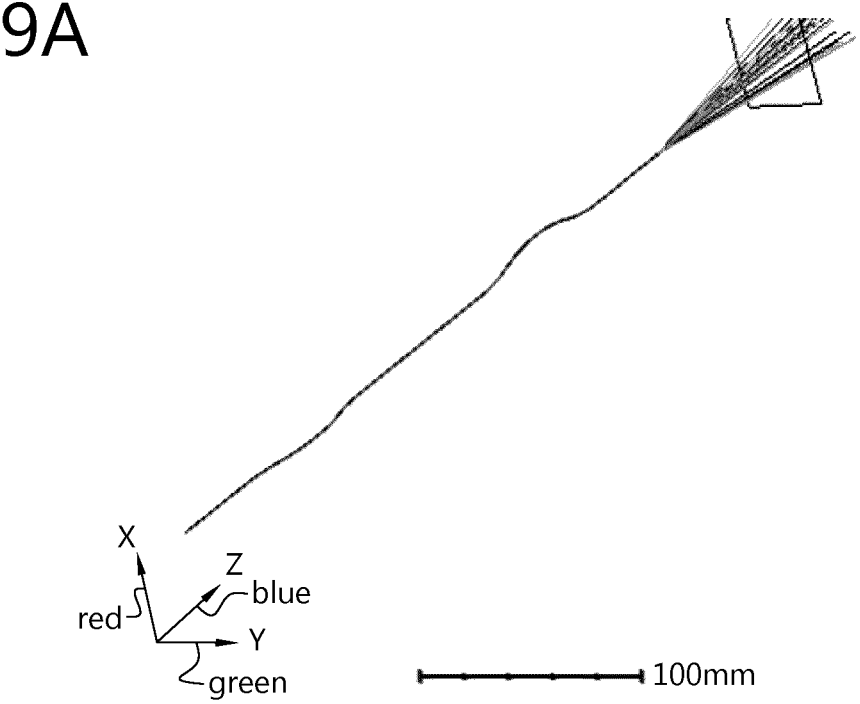
FIGS. 9A and 9B show an embodiment of the present invention comprising angular light distribution charts.
Figure 9B:
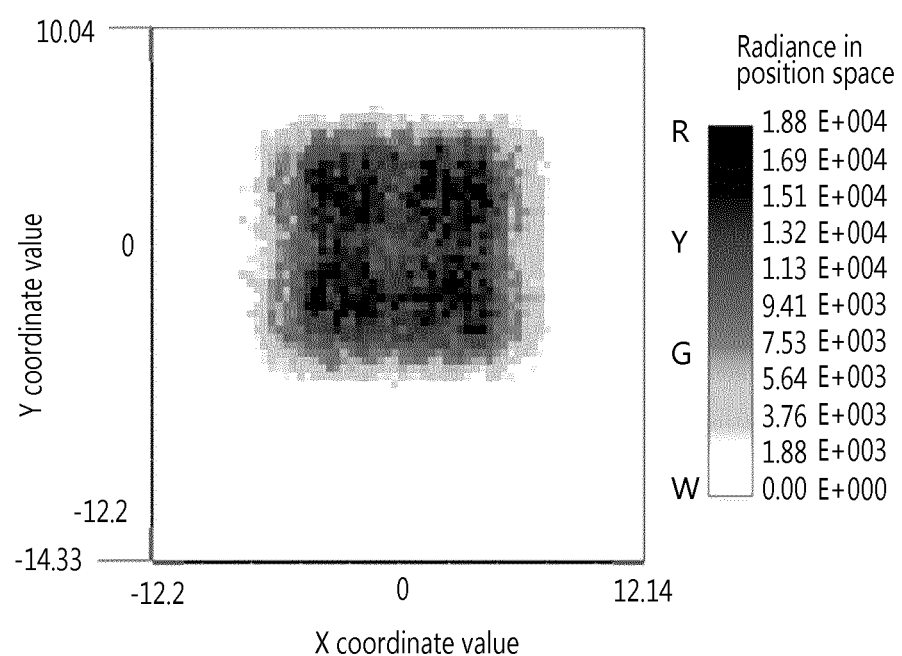

FIG. 9A shows how the above exemplary optical fiber has been bent in the horizontal and vertical direction with a bending radius of 10 cm. Additionally, using a four sub light source as the one in FIG. 5, the angular light distribution at the output exhibits no gaps, see FIG. 9B. The spatial light distribution (not shown here) also remains uniform. Additionally, the bending can be varied over time (e.g. vibrated) to create the equivalent of a moving diffuser. This can reduce light speckle effects in the output image.

The diffusion angle increases every time the optical fiber changes its bending direction. The amount of diffusion added is a function of the bending radius. As with a cascade of normal Gaussian diffusers, the effect is not additive, but is given by the square root of the quadratic sum of the diffusion angles as illustrated in equation 1.

$$\text{Output angle} = \sqrt{\text{angle diffuser 1}^2 + \text{angle diffuser 2}^2} \quad (1)$$

Figure 10:
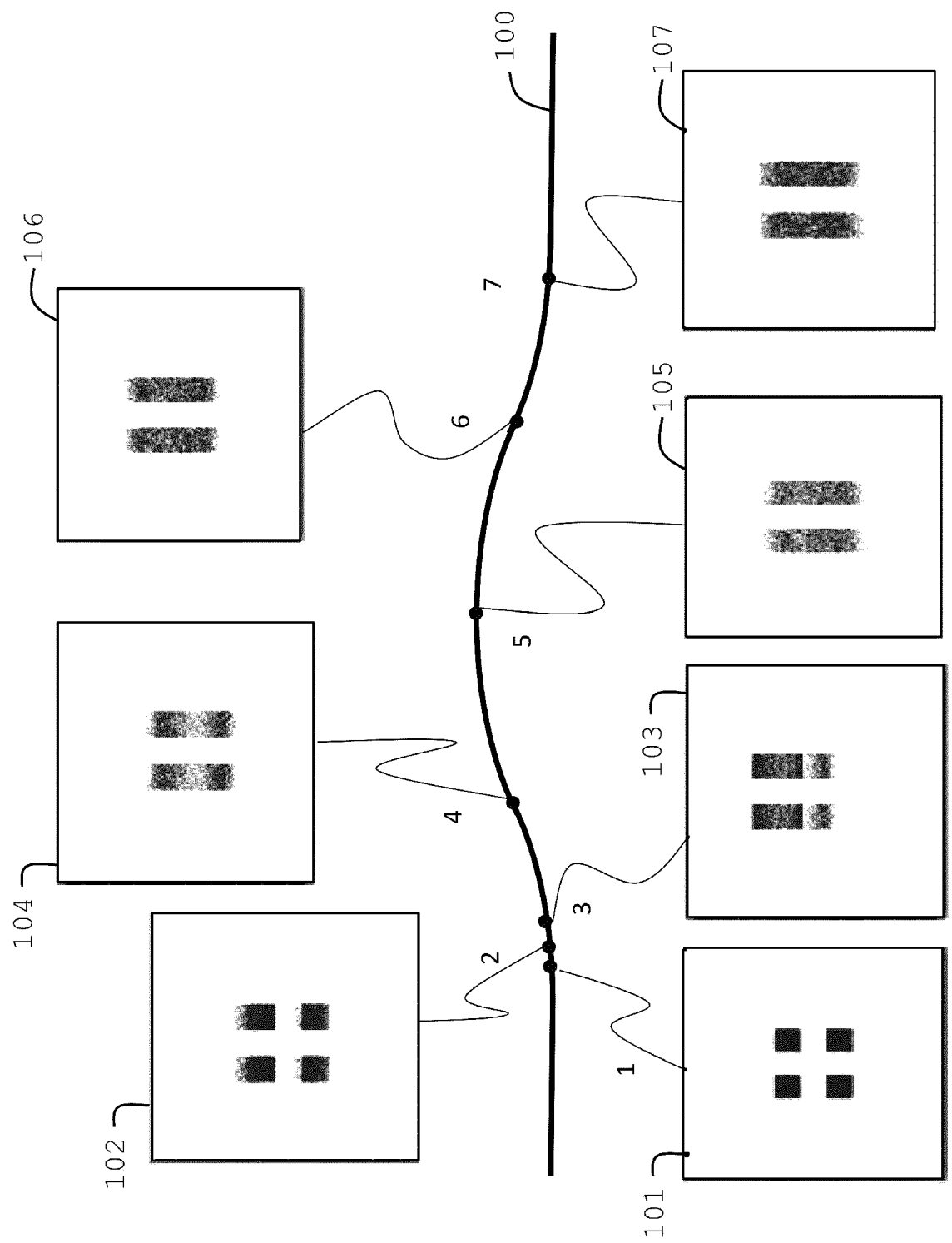
FIG. 10 shows an embodiment of the present invention comprising angular light distribution charts.

FIG. 10 shows an exemplary embodiment of the present invention comprising a (e.g. rectangular) optical fiber 100, where the angles evolve gradually over a 1-dimensional vertical S-shape bending of the optical fiber. The angular light distributions 101 to 107 are shown for seven points from left to right (marked "1" to "7") on the optical fiber. After a straight optical fiber section at point 1 the initial angular light distribution 101 is the same as what was launched at the entrance of the optical fiber. At the start of the first bend at point 2, the light rays transition from the straight optical fiber part into the bent optical fiber part so that the reflected angles are increased, and the angular light distribution 102 starts to expand in one direction. When the light continues along an optical fiber with constant bending radius and bending direction, the angular increase arising from the light bouncing at one side of the optical fiber, is compensated by the angular decrease arising form the light bouncing at the opposite side of the optical fiber, and the total angle distribution does no longer expand. However, the effect of vertical mirroring in point 103 can be seen in that the vertical gaps start to get filled. In point 104 the mirroring operation is completed (the vertical gap is filled). Every time the bending direction changes, this effect is repeated and the result corresponds to that of adding an additional diffuser. Moving from point 5 to point 6 to point 7, an increased effect of vertical diffusion can gradually be seen. But because of the square root law of equation (1), the effect of the fourth bending in point 7 is relatively minor. The same type of S-shape bending can be applied in the other direction to obtain a horizontal diffusion as well.

One observes that an amount of 1-dimensional diffusion can be added every time the optical fiber transitions from a straight section into a bent section. The amount of diffusion can be related to the bending radius. Continuing further with the same bending radius and bending direction no longer affects the angular light distribution. But bending the optical fiber back to a straight shape, and then bending it in the opposite direction can further increase the amount of diffusion (although not in a linear way). Hence, by controlling the optical fiber trajectory and the bending radii it is possible to tailor the desired amount of diffusion.

The bending radius of the optical fiber can be between 200 and 1000 times larger than its height, for example 100 mm bending radius versus 0.1 mm optical fiber height. The angles after the first bending (point 4) can be expanded by approximately +/−0.75 degrees. After the full S-curve (at point "7") the angles can be expanded by approximately +/−1.5 degrees.

Embodiment IV, Rounded Cross-Section Corners

Current optical fiber production processes may result in the optical fiber having rounded cross-section corners, these therefore having a radius of curvature. Therefore, overfill may be required to keep the rounded cross-section corners outside the active area of a first light modulator, which will lead to light losses. It can be desired to minimize the rounding of the optical fiber cross-section corners to minimize such light losses.

The rounding of the cross-section corners can, however, introduce an effect of radial mixing in the angle space. Therefore, it may no longer be required to apply bending in both horizontal and vertical direction to have a full diffusing effect. It can be adequate to introduce bending in any random direction and the rounded cross-section corners will provide radial mixing. For example, the rounding of the cross-section corners can preferably have a radius of less than 5% of the optical fiber width in order to minimize overfill. But preferably, the radius is still large enough, for example more than 1% of the optical fiber width, to introduce sufficient radial mixing over a limited length of 1-2 meter.

A single piece of rectangular optical fiber with corner rounding can introduce mixing on three levels:

1/ Spatial uniformity mixing over the rectangular cross-section, delivering a uniform rectangle (possibly with rounded corners) at the output.
2/ Axial angular uniformity mixing by bending of the optical fibers. The amount of bending should be minimally sufficient to close the axial distance between adjacent laser diodes.
3/ Possibly radial angular uniformity mixing as a result of rounded cross-section corners, thereby eliminating the gaps in angle space between adjacent diodes in the radial direction.

Embodiment V, Straight Optical Fiber

In one exemplary embodiment there is provided a straight optical fiber, e.g. with a cross-section of 315×166 µm having corner roundings with a radius of e.g. 50 µm and a length of 1 meter.

A point light source such as a laser with a square angular profile of +/−6.5 degrees in horizontal and vertical direction is positioned to project light into the optical fiber. The point source can be located a distance of e.g. 300 µm before the optical fiber entrance such that a reduced area, e.g. only an area of 66×66 µm, is illuminated at the entrance.

Figure 11:
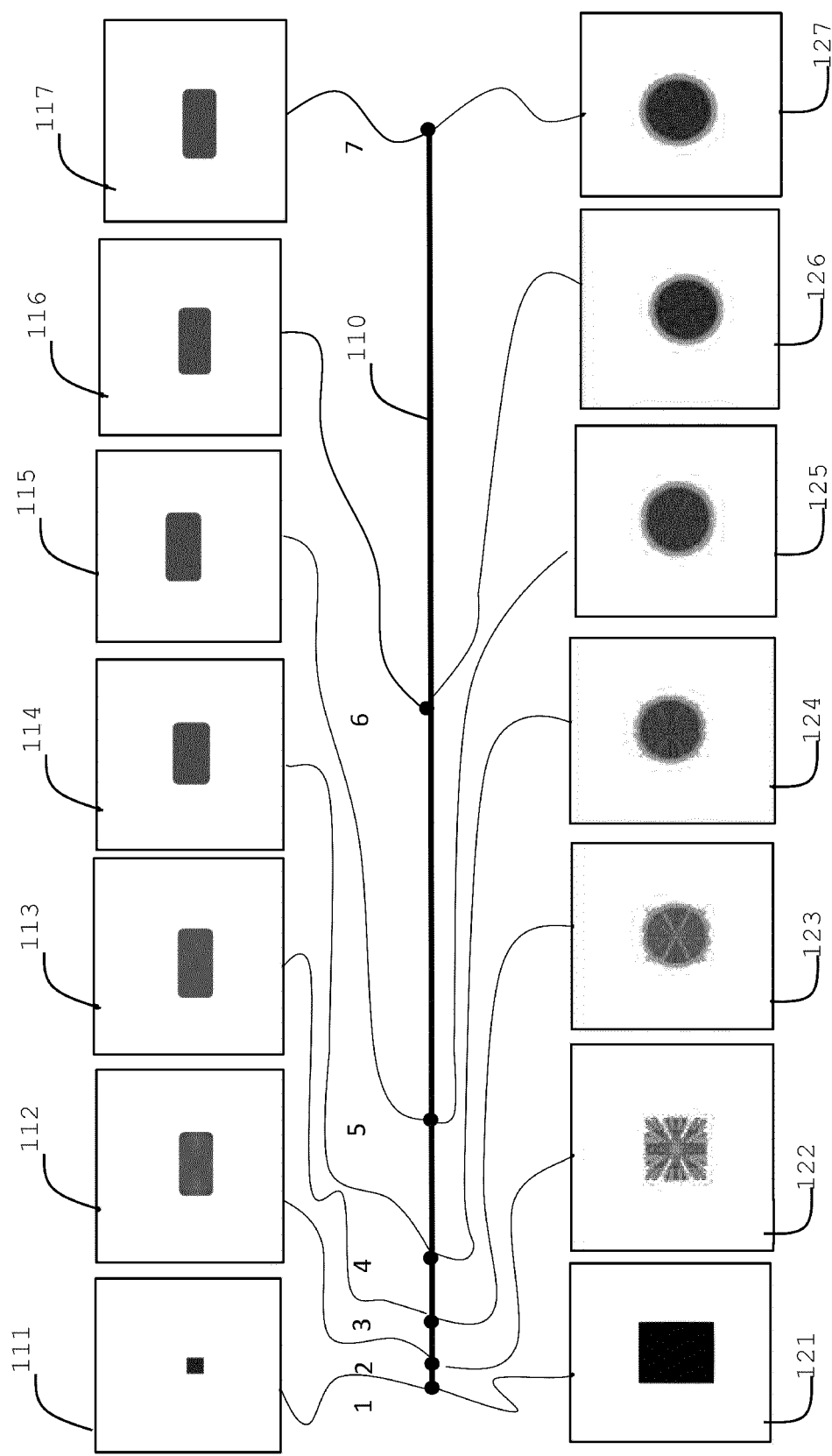
FIG. 11 shows an embodiment of the present invention comprising spatial and angular light distribution charts.

FIG. 11 shows an embodiment of the present invention comprising the above mentioned optical fiber 110 and the evolving spatial and angular light distribution profiles, 111 to 117 and 121 to 127, respectively, at various points 1 to 7. The points "1" to "7" are located, respectively, at the optical fiber entrance and then 1-, 5-, 10-, 20-, 50- and 100 cm from the optical fiber entrance. The members of the various locations are summarized in table 1.

The spatial uniformity 112 in point "1" after 1 cm is not yet perfect. Also the corresponding radial mixing, illustrated in the angular light distribution 122, is incomplete. In point "3" after 5 cm, the spatial uniformity is nearly perfect, and in point "4" after 10 cm also the radial mixing, as seen in the angular light distribution 124, is nearly completed to full coverage.

In this example the cross-section corner roundings are relatively large (radius is 15% of the optical fiber width). However, as the amount of radial mixing is expected to be proportional to the radius/width ratio and we see proper angular mixing after 10 cm, even with a 10 times smaller ratio (e.g. radius is 1.5% of the optical fiber width), the optical fiber is expected to provide adequate radial mixing over 1 meter length.

TABLE 1

| Point number | Optical fiber location from entrance (cm) | Spatial Distribution, member | Angular Distribution, member |
| --- | --- | --- | --- |
| 1 | 0 | 111 | 121 |
| 2 | 1 | 112 | 122 |
| 3 | 5 | 113 | 123 |

TABLE 1-continued

| Point number | Optical fiber location from entrance (cm) | Spatial Distribution, member | Angular Distribution, member |
| --- | --- | --- | --- |
| 4 | 10 | 114 | 124 |
| 5 | 20 | 115 | 125 |
| 6 | 50 | 116 | 126 |
| 7 | 100 | 117 | 127 |

Embodiment VI, Dual Stage Uniformization, Collimator

Additionally or alternatively, in another embodiment of the present invention, the spatial and angular uniformities can be improved by implementing a dual stage uniformization solution comprising "optical fibers" or "integrator rods" together with "Fourier transforming optics" or just "Fourier optics". Such Fourier optics can act as a "translator" between the angular and linear space. Fourier optics can the positioned such that the exit of the first uniformization structure coincides with the first focal point of the Fourier optics and the input of the second uniformization structure coincides with the second focal point of the Fourier optics. At the exit of the first stage, a good spatial uniformity can be obtained, but the angular uniformity may not yet be optimal. The Fourier optics can transform the angular light distribution at the exit of the first uniformization stage into a spatial distribution at the entrance of the second uniformization stage and vice versa (the spatial distribution at the exit of the first uniformization stage into an angular light distribution at the input of the second uniformization stage). The second stage fixes the non-uniformity in the spatial distribution and delivers a spatially uniform exit. It also maintains the uniform angular light distribution that was presented at its entrance provided that the shape of this distribution is square or rectangular and the corners are sufficiently sharp. Hence, at the exit of the dual stage system both spatial and angular uniformity are fully guaranteed and virtually independent from the input characteristics. Multiple sources are properly mixed in space and angle, eliminating issues of differential temperature or aging effects, and providing optimal despeckling. In most cases the natural divergence of the laser beam(s) will be adequate to achieve good mixing over a reasonable length of the first optical fiber stage. And it will not be required to introduce additional diffusion which could grow the &endue of the laser beam unnecessarily. If the laser beam is of too good beam quality a small level of diffusion introduced either by controlled bending of the first optical fiber stage or by placing a diffuser in front of a first integrator rod, will be sufficient to achieve good mixing over a reasonable optical length of a few cm.

Fourier optics can be implemented with e.g. an optical lens system.

Patent application WO2012139634 discloses a dual uniformization structure solution. However, there the optical lens system between the two stages is configured to image the exit of the first stage onto the entrance of the second stage, and a diffuser is placed in front of each of the stages.

Figure 12:
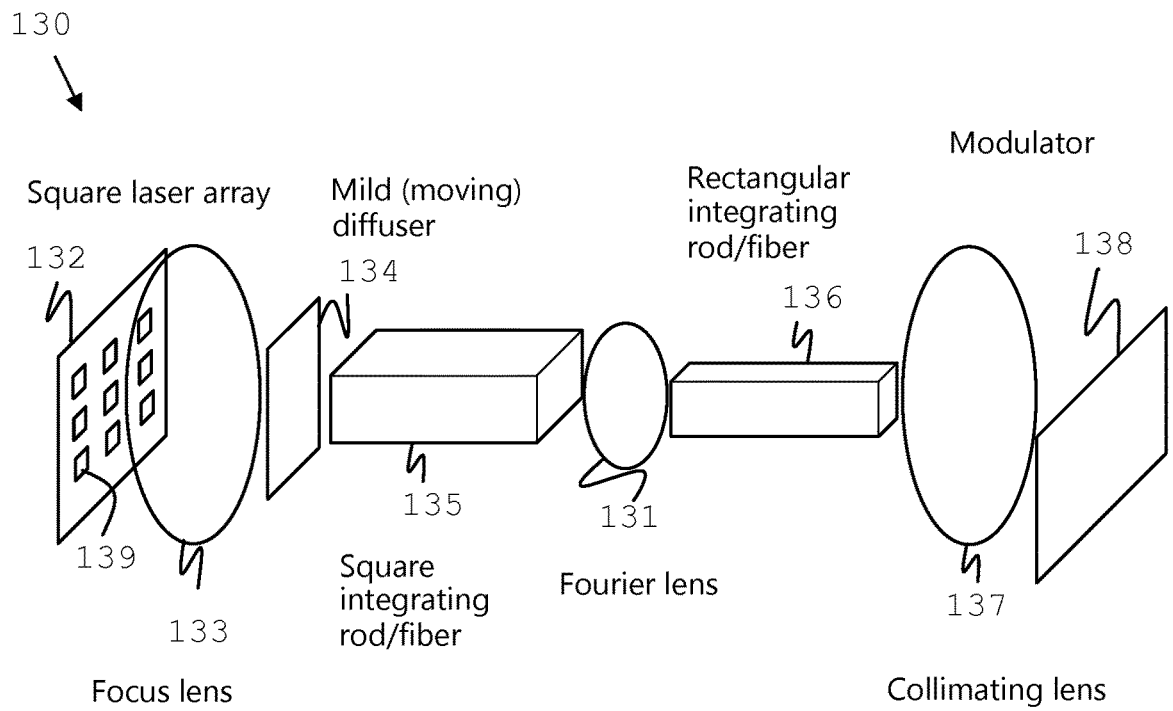
FIGS. 12 to 14 show embodiments of the present invention comprising dual stage uniformization structure systems.

FIG. 12 shows an embodiment of the present invention comprising system 130 having a dual uniformization structure solution and a Fourier lens 131. In this embodiment the output from the second uniformization structure 136 can be expanded and collimated onto the light modulator 138. The light beam (not shown), e.g. laser light, originates from the light source 132, which can be square and have sub-light sources 139, and passes a focus lens 133 and a static or moving diffuser 134 before it enters the first uniformization structure 135, e.g. a rectangular integrating rod or optical fiber. The diffuser may have a rather low angular spread and is preferably adapted in this respect to work with the first uniformization structure 135, e.g. the rectangular integrating rod or optical fiber. At the exit of the first uniformization structure 135 there is a Fourier optics component, e.g. a Fourier lens 131, and then the light beam can enter a second uniformization structure 136, e.g. a square integrating rod or optical fiber, before it gets collimated by a collimating lens 137 onto a light modulator 138.

The system 130 may be a light steering system wherein the light modulator 138 is a first light modulator out of two (or more) light modulators. Alternatively, the system 130 may be a conventional single light modulator system, wherein the light modulator 138 is the only light modulator.

If the first uniformization structure 135 is a rectangular integrating rod or optical fiber, the aspect ratio of its cross-section can determine the ratio between horizontal and vertical angles at the exit of the second stage. The collimation lens 137 following the dual stage integrator (or uniformization system) can translate or transform the horizontal and vertical angles into a uniform rectangular spot at the modulator 138. In this case, the first uniformization structure 135 is preferably rectangular with an aspect ratio identical to the aspect ratio of the modulator 138. The spatial uniformity at the exit of the second uniformization structure 136 determines the angular light distribution after collimation. The second uniformization structure 136 can be square to create a symmetric PSF in a light steering system. For a single light modulator system, a square uniformization structure 136 can create and approximate a round aperture in the optical path.

The minimum required cross-section of the second uniformization structure is determined by the angular subtense of the light source launched in the first optical fiber. In a light steering system preferably this cross-section is kept as small as possible to maintain the point spread function as small as possible.

While a round or hexagonal point spread function might be more preferred, it is not possible to use a round or hexagonal cross-section geometry for the second uniformization structure, because only a rectangular or square optical fiber will maintain the angular light distribution produced by the first stage. Further, a round cross-section geometry will also not produce the desired spatial uniformity.

In case the second uniformization structure is implemented with an optical fiber, roundings in the cross-section corners are undesirable, since radial mixing will interfere with the requirement to maintain the horizontal and vertical angular light distribution presented at the input of this stage. It is therefore desirable to limit corner roundings to the minimal achievable and restrict the length of the second stage to the minimum length required to obtain sufficient spatial mixing.

Embodiment VII, Dual Stage Uniformization, Imaging

Figure 13:
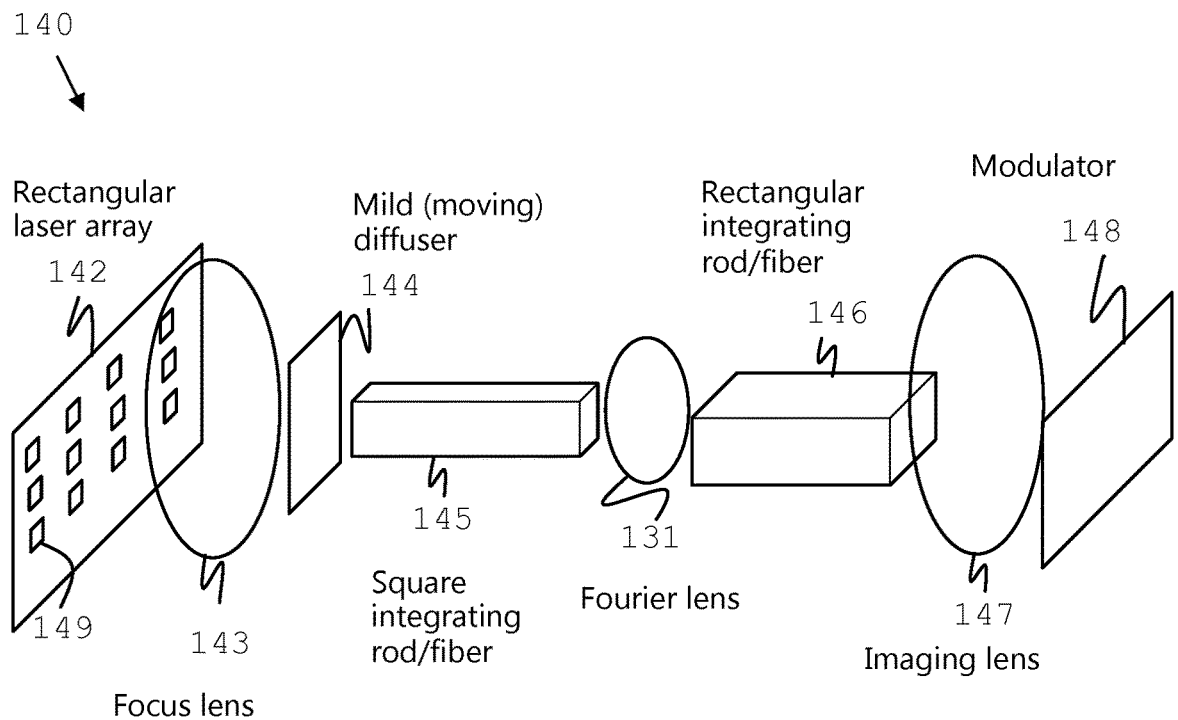

FIG. 13 shows another embodiment of the present invention where the second uniformization structure 146 can be rectangular and the first uniformization structure 145 can be square. The light beam (not shown), e.g. laser light, originates from the light source 142, which can be rectangular and have sub-light sources 149, and passes a focus lens 143 and a static or moving diffuser 144 before it enters the first uniformization structure. The static or moving diffuser 144 can have a low angular spread and is preferably adapted to work with the first uniformization structure. In this embodiment the output from the second uniformization structure 146 can be directly imaged onto the light modulator 148 by means of an imaging lens 147.

For a system with light steering (comprising at least two light modulators), the first uniformization structure 145 can then determine the shape of the point spread function in the intermediate image. For a single light modulator system, the first uniformization structure 145 can create and approximate a round aperture in the optical path. The first uniformization structure 145 is preferably square or hexagonal in shape.

A second uniformization structure comprising optical fibers with cross-section corner roundings, can provide radial (angular light distribution) mixing. It can also transform a square or hexagonal angular light distribution into a more desirable round distribution.

Cross-section corner roundings in the first uniformization structure may be tolerated if the light source array is e.g. round or square. There will then be a round light spot at the entrance of the second uniformization structure that can be fit within the shape (e.g. rectangular) of the second uniformization structure, however resulting in unutilized system étendue.

Alternatively, the laser array can have a rectangular shape and an aspect ratio that fits the aspect ratio of the light modulator. To maintain the rectangular angle distribution profile, the first uniformization structure should preferably be square and the degree of corner roundings as well as the fiber length should be minimized.

Embodiment VIII, Dual Stage Conventional Uniformization Structures

In another embodiment of the present invention there is provided a two stage uniformization or integration system comprising two conventional integrators e.g. fused silica rods rods or hollow light pipes ("integrators"), preceeded by diffusing components (or "diffusers"), and intermediate imaging (Fourier) optics and a light modulator. An "integrator" can be a "uniformization structure". The set-up can be analogue to that shown in FIG. 12 or 13.

Examples of conventional integrators can be hollow light tunnels https://materion.com/-/media/files/precision-optics/data-sheets-2012/light-tunnel-data-sheet.pdf?la=en&hash=1B2EE007DE55470622DCA2D0A90842D6EDD0C01A or solid rods https://www.newport.com/f/light-pipe-homogenizer.

An array of laser sources can be focused into a first square integrator. The second integrator can have a rectangular cross-sectional aspect ratio matching the cross-section aspect ratio of the light modulator. Fourier optics can be placed between the integrators to translate the angular light distribution at the output of the first uniformization structure into a spatial light distribution at the entrance of the second uniformization structure (and likewise, the uniform spatial light distribution at the exit of the first uniformization structure can be translated into a uniform angular light distribution at the entrance of the second uniformization structure).

In order to use all of the available étendue the entrance of the second uniformization structure, the angles at which the light is coupled in from the laser array are ideally asymmetrically distributed as well. This can be achieved if he laser array is arranged in a rectangle with the same cross-sectional aspect ratio as the light modulator, and if the first uniformization structure is square. In this way, it maintains the angular light distribution of the light that is launched into it, which is not the case for e.g. a hexagonal rod.

Additionally, a static or moving diffuser can be placed in front of the first uniformization structure to enable good mixing with minimal rod length. The static or moving diffuser can have a low angular spread and is preferably adapted to work with the first uniformization structure. However, there is no need for a diffuser in front of the second uniformization structure.

The cross-section of the first uniformization structure can determine the system aperture, which here becomes square rather than round. If the physical apertures in the illumination system or projection lens are circular, the above system square aperture should be fitted in the circular apertures. The resulting light loss due to unutilized &endue can be compensated by the improved fit of the light beams at the entrance of the integrator rods, and by the elimination of the second diffuser. Overall, the &endue is better utilized and more laser diodes can be coupled into the system, or the f-number of the system can be increased which further benefits the projector's contrast and reduces the size of the optical components.

In a preferred embodiment, the physical system apertures in the illumination system and in the projection lens are square as well.

It is advantageous that the mixing of the individual light sources, e.g. laser diodes, in the array is nearly perfect in both spatial and angular domain. For example, wavelength diversity for despeckling can be enabled by using only one light source, e.g. laser diode, for each wavelength. With the approach of WO 2012139634 a low number of light sources, e.g. laser diodes, will lead to the need for very strong diffusers, to close the angular gaps between light sources, e.g. laser diodes, of the same wavelength. Strong diffusers will increase the PSF diameter, which is unwanted in a light steering system. It is to be noted that to also enable optimal despeckling via angular diversity, it is recommended to move or vibrate the diffuser which is located in front of the first uniformization structure.

Embodiment IX, Dual Stage, Optical Fiber Uniformization Structures

Figure 14:
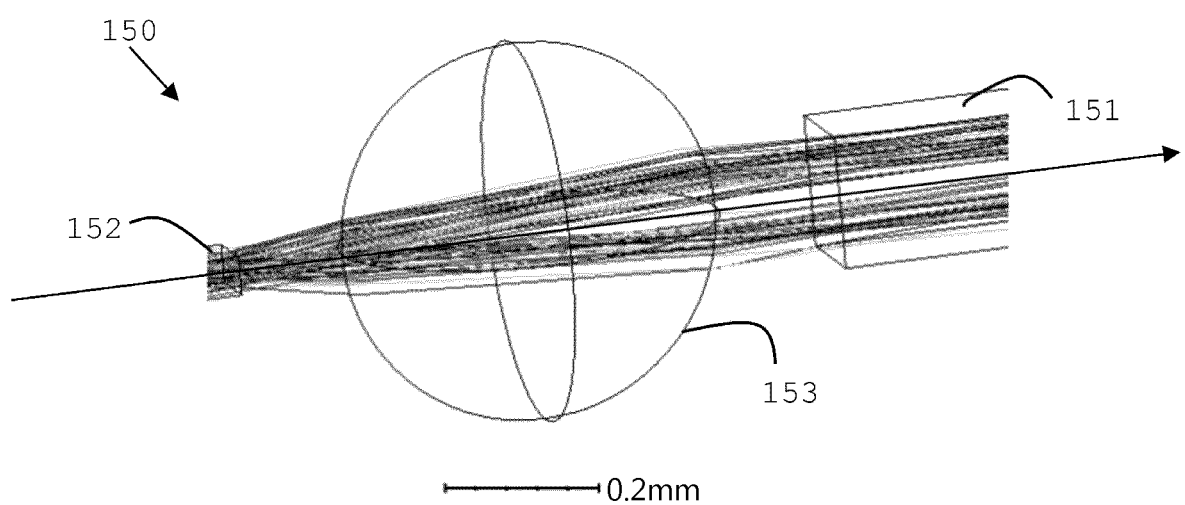

FIG. 14 shows an embodiment of the present invention comprising a system 150 having a first uniformization structure 151 e.g. a rectangular optical fiber, with a cross-section of e.g. 160×90 μm. The system 150 can further comprise a second uniformization structure 152, e.g. a square optical fiber, for example having a cross-section of e.g. 175×175 μm. In between the two uniformization structures a Fourier lens 153 is located, e.g. a fused silica ball lens, for example with a diameter of 0.5 mm. Both optical fibers can e.g. be 30 mm in length.

Figure 15:
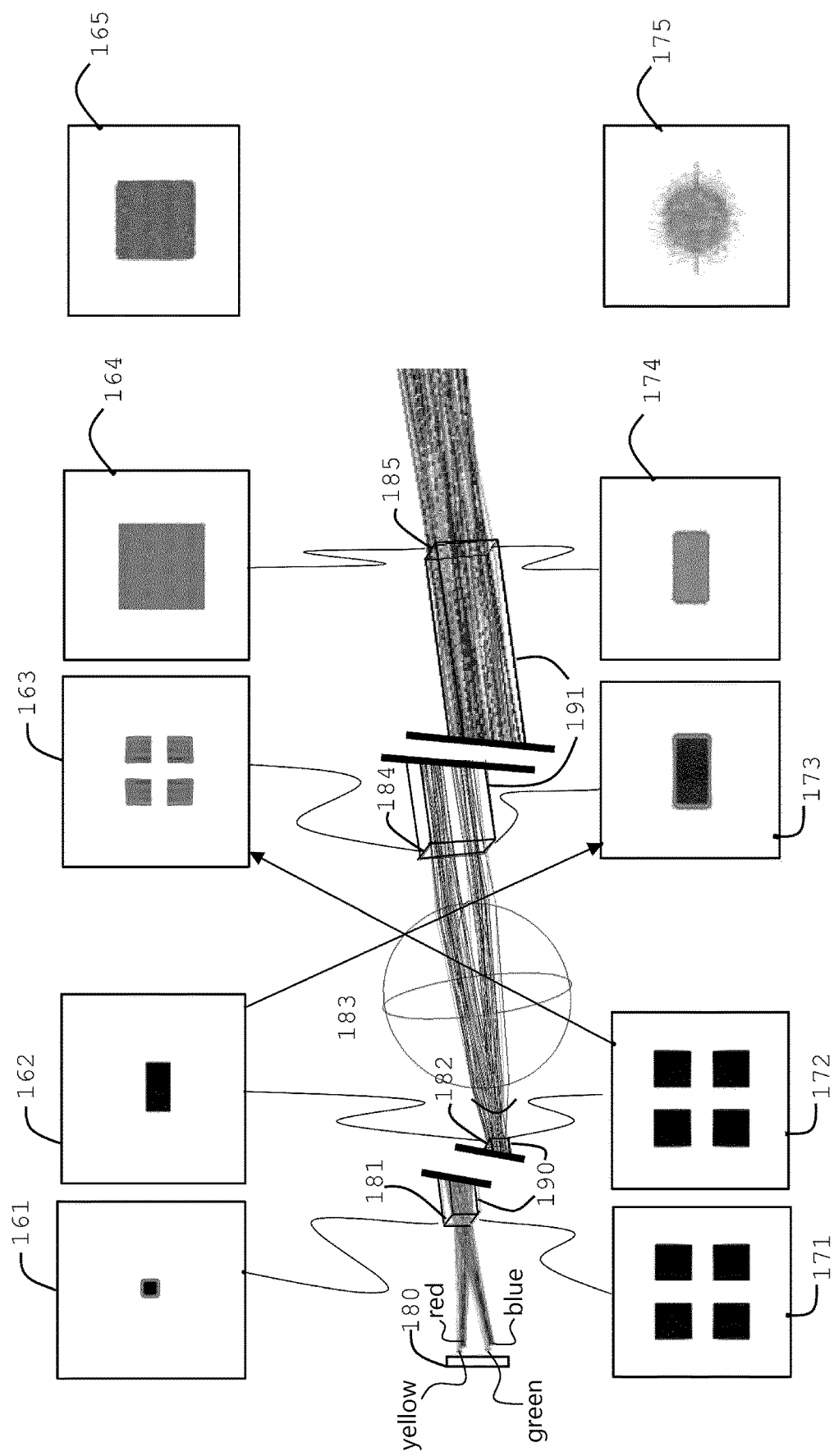
FIG. 15 shows an embodiment of the present invention comprising spatial and angular light distribution charts for a dual stage uniformization structure system.

FIG. 15 shows the corresponding spatial- and angular light distributions 161 to 165 and 171 to 175, respectively. The light source 180 can be a quad source setup like that of FIG. 5. Further shown are the entrance 181 and exit 182 of the first uniformization structure 190.

Further shown are the entrance 184 and exit 185 of the second uniformization structure 191.

At the entrance 181 of the first uniformization structure 190, the spatial distribution 161 is a square illumination spot of e.g. 40 μm that does not completely fill the cross-section of the rectangular optical fiber. The corresponding angular light distribution 171 shows four discrete angles related to the four sources.

At the exit 182 of the first uniformization structure 190, the spatial distribution 162 is a uniform filling corresponding to the rectangular optical fiber cross-section. However, the corresponding angular light distribution 172 remains as four discrete angles. This is because the symmetrical angular profile is maintained horizontal, and vertical mirroring has no effect.

When the light has passed the ball lens 183, the spatial and angular profiles have "switched position", as indicated by the arrows (with some minor distortion and blurring). Therefore, at the entrance 184 of the second uniformization structure 191, the spatial distribution 163 is now spread on four discrete positions, and the corresponding angular light distribution 173 is homogenous in one filled rectangle.

At the exit 185 of the second uniformization structure 191 the spatial distribution 164 is a uniform square profile, and the angular light distribution 174 is the same filled rectangle as in the entrance angular distribution 173 (since there is no effect of horizontal and vertical mirroring). In case the second uniformization structure is a an optical fiber with rounded cross-section corners, the final spatial- and angular distributions would be as represented in 165 and 175, respectively.

Hence, the gaps in the angular profile that exist at the input are closed without the introduction of any diffusion. Some blurring can be observed near the edges resulting from spherical aberrations of the Fourier lens.

Even with only one of the four light sources activated, the angular and spatial output distribution remains intact. This is also the case when the angle at which the single source is coupled, is modified. Thus, the set-up described in FIG. 15 can deliver stable angular- and spatial distribution profiles, even if the spatial and or angular light distribution at the input changes.

Therefore, if the input from the different primary colors of the light source is different, the present invention can provide a uniform illumination of each light modulator and the same uniform point spread function for every primary color. The best common point spread function that can be achieved is limited by the primary color with the largest &endue.

While the invention has been described hereinabove with reference to specific embodiments, this was done to clarify and not to limit the invention. The skilled person will appreciate that various modifications and different combinations of disclosed features are possible without departing from the scope of the invention.

The invention claimed is:

1. An image projection system for use with a light source, the image projection system comprising a light modulator and a uniformization structure, the uniformization structure having an elongated shape and being adapted to receive light from a light source and to guide the light onto the light modulator, wherein the uniformization structure has a rectangular cross-sectional area, and one or more bendings, wherein the uniformization structure has a cross-section area having a shortest side, and each bending radius is at least 200 up to 1000 times larger than a length of the shortest side of the cross-section area, and wherein the cross-section area of the uniformization structure has corners and wherein a shape of each corner is rounded with a radius of curvature.

2. The system according to claim 1, wherein the light modulator has an image area, and the aspect ratio of the cross-section area of the uniformization structure is the same as the aspect ratio of the image area of the light modulator.

3. A method for use with a light source and for diffusing light in an image projection system comprising a light modulator and a uniformization structure, the uniformization structure having an elongated shape, a rectangular cross-sectional area, and being adapted to receive light from a light source and to guide the light onto the light modulator, wherein the method comprises:
  bending the uniformization structure in one or more places,
  wherein the uniformization structure has a cross-section area having a shortest side, and the method comprising the step of configuring each bending radius to be at least 200 up to 1000 times larger than a length of the shortest side of the cross-section area, and wherein the cross-section area of the uniformization structure has corners and the method comprises comprising configuring each corner into a rounded shape defining a radius of curvature.

4. The method according to claim 3, wherein the light modulator has an image area, and the method comprising configuring the aspect ratio of the cross-section area of the uniformization structure to be the same as the aspect ratio of the image area of the light modulator.

5. The method according to claim 3, wherein the uniformization structure adopts different bending radii at different points in time or the bending radius is varied with a frequency.

6. The system according to claim 1, wherein the rounded shape of each corner of the uniformization structure having a radius of less than 5% of the uniformization structure width and more than 1% of the uniformization structure width.

7. The system according to claim 1, wherein the rounded shape of each corner of the uniformization structure has a radius ranging between 1.5% to 15% of the uniformization structure width.

8. The method according to claim 3, wherein the rounded shape of each corner of the uniformization structure having a radius of less than 5% of the uniformization structure width and more than 1% of the uniformization structure width.

9. The method according to claim 3, wherein the rounded shape of each corner of the uniformization structure has a radius ranging between 1.5% to 15% of the uniformization structure width.

10. An image projection system for use with a light source, the image projection system comprising a light modulator and a uniformization structure, the uniformization structure having an elongated shape and being adapted to receive light from a light source and to guide the light onto the light modulator, wherein the uniformization structure having a cross-section area configured to have sides coupled by rounded corners, and the uniformization structure having at least one bending, wherein the uniformization structure has the cross-section area having a shortest side, and each bendings radius is at least 200 up to 1000 times larger than a length of the shortest side of the cross-section area, and wherein a shape of each corner is rounded with a radius of curvature.

11. The system according to claim 10, wherein the corner of the uniformization structure having a radius of less than 5% of the uniformization structure width and more than 1% of the uniformization structure width.

12. The system according to claim 10, wherein the corner of the uniformization structure has a radius ranging between 1.5% to 15% of the uniformization structure width.

13. The system according to claim 10, wherein the cross section of the uniformization structure is rectangular.

14. The system according to claim 10, wherein the light modulator has an image area, and an aspect ratio of the cross-section area of the uniformization structure is the same as an aspect ratio of the image area of the light modulator.

15. The system according to claim 1, wherein the uniformization structure is an optical fiber.

* * * * *